Inventor
John A. Bennett-Powell,
By [signature]
Atty.

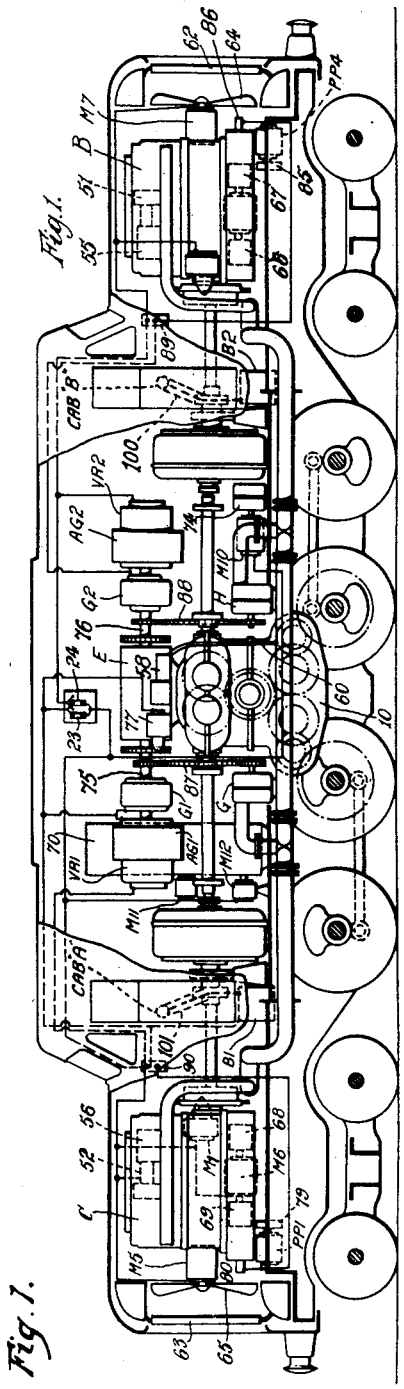

Patented Jan. 6, 1953

2,624,849

UNITED STATES PATENT OFFICE 2,624,849

COMPRESSION IGNITION ENGINE POWER PLANT

John Ambrose Bennett-Powell, Tendring, England, assignor to Fell Developments Limited, London, England, a British company Application July 25, 1949, Serial No. 106,670
In Great Britain August 17, 1948

5 Claims. (Cl. 290—4)

1

This invention relates to compression ignition engine power plants, and particularly but not exclusively to multiple engine power plants such as are described in the specification of application No. 693,613 filed August 29, 1946, or of application No. 793,903 filed December 26, 1947, both by L. F. R. Fell.

In operating such power plants to give high torques at low speed, cooling of the main engines presents certain problems. The heat to be dissipated from a diesel engine is approximately directly proportional to the power output, except that at low speeds under load, such as are encountered in starting a vehicle when the power plant is used for traction purposes, the quantity of heat to be dissipated is somewhat greater than that indicated by this relationship. Direct mechanical drive of cooling means, such as fans or water pumps, from the main engine or engines will not be suitable since cooling will either be inadequate at low speeds or excessive at high speeds or both. The same objection applies to direct drive from the auxiliary engine or engines described in the specifications referred to above, since the speed of such engine or engines also increases with increased main engine speed.

The object of the present invention is to provide, in power plants as indicated above, a drive for the cooling means which will enable their cooling capacity to be substantially commensurate with the heat dissipation requirements of the power plant under running conditions.

A compression ignition power plant arranged to give high torque at low speed is provided, according to the present invention, with cooling means operated electrically at a speed which gives a rate of heat dissipation substantially equivalent to the rate of heat generation in the main engine. Thus for substantially constant power output from the power plant, substantially constant-speed operation of the cooling means is required, while for a power plant giving higher power output at lower than at higher speeds it will be necessary to operate the cooling means at high speed when the power plant is at low speed and vice versa.

More specifically stated, a compression ignition power plant arranged to give substantially constant power output over its running speed range is provided, according to the present invention, with cooling means operated by a direct current motor or motors supplied from a direct current generator fitted with an automatic voltage regulator to ensure substantially constant output voltage.

2

The constant voltage direct current generator is preferably driven from an auxiliary engine such as the engine which drives the blower described in the specifications referred to above, in order to leave the output of the main engine or engines unimpaired.

It is generally preferable to neglect the supernormal heat dissipation requirements at low speeds under load, since the period of slow running is short and generally occurs when the coolant and the engines are relatively cool, so that the heat not dissipated by the cooling means gives more rapid increase of engine temperature to operating temperature, which is generally advantageous.

In a four-engine power plant such as that described in the specification of application No. 793,903, above referred to a constant voltage direct current generator may be associated with and driven by each of the two auxiliary engines and the cooling means and other auxiliary apparatus arranged to provide substantially equal loads for each generator. In such an arrangement, the use of electrical drive for the cooling means and other auxiliary apparatus has the advantage that it is easy to transfer the drive for any given unit of the cooling means or auxiliary apparatus from one auxiliary engine to the other by switching it from one generator to the other.

By arranging for the direct current generator to start the main engines as well as driving the cooling means and other auxiliaries, large starter batteries for the main engines are eliminated.

The invention further consists in the new or improved features, arrangements and combinations of parts embodied in the preferred form of the invention which it is now proposed to describe in some detail with reference to the accompanying drawings in which:

Figure 1 shows a side elevation of a locomotive embodying the present invention with the major portion of the external cowling removed to show the principal components of the locomotive.

Figure 2 shows a plan view of the locomotive shown in Figure 1 (all cowling having been removed and omitting electrical wiring as shown in Figure 1).

Figure 3:
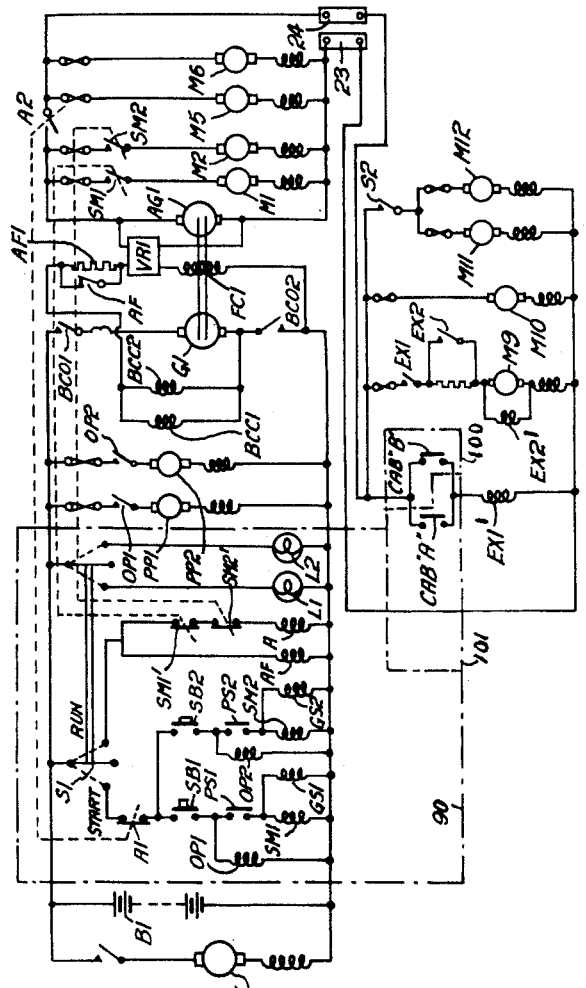
Figure 3 shows a wiring diagram of the electrical system of the present invention which is embodied in the locomotive of Figures 1 and 2.

Referring now to Figures 1 and 2, the locomotive shown is provided with a power plant comprising four compression ignition engines A, B, C, D situated in pairs A, B and C, D near the ends of the locomotive chassis. The output from each of these engines is taken by suitable transmission means which form no part of the present invention, to a gear box 10 arranged substantially centrally in the locomotive chassis and thence to the driving wheels of the locomotive. Auxiliary internal combustion engines E and F drive blowers G and H by means of chain drives 87 and 88 respectively, these blowers G and H supply air through pipes K and L to supercharge the engines A, B, C and D. By means of this supercharging and also by means of control means indicated generally by 50, 51, 52 and 53 for fuel injection pumps 54, 55, 56 and 57 of engines A, B, C and D respectively, the engines A, B, C and D may be made to give substantially constant power output over their running speed range as explained in more detail in the specification of copending application No. 109,635 dated August 11, 1949, by L. F. R. Fell and R. J. W. Cousins; control of the auxiliary engines in response to supercharge pressure as referred to in this copending application is provided by pressure sensitive devices 58, 59 for engines E and F respectively. Pipes 60 and 61 connect devices 58 and 59 respectively to pipes K and L. Starter motors 77 and 78 are provided for auxiliary engines E and F respectively.

Cooling means for the locomotive power plant comprise radiators 62 and 63 for pairs of engines A, B and C, D respectively, fans 64 and 65 associated with radiators 62 and 63 respectively to ensure relative motion of air over the radiators to cool them, and water circulating pumps 66, 67, 68 and 69 for engines A, B, C and D respectively. Fans 64 and 65 are driven by motors M7 and M5 respectively. Pumps 66 and 67 are driven by motor M8 and pumps 68 and 69 are driven by motor M6. Radiators 62 and 63 are principally employed for cooling the water which circulates through the cylinder jackets of the main engines but may have certain of their cooling elements arranged to cool oil from the main engine oil circulating systems as is well known in large engine installations.

The locomotive is also provided with a boiler 70 for train heating purposes and motors M11 and M12 are provided for the feed pump and blower respectively of this boiler.

Exhauster pumps 73 and 74 are provided for supplying the vacuum system of the locomotive, and are driven by motors M9 and M10 respectively.

The electrical power for the locomotive is provided by generators G1 and AG1 driven by auxiliary engine E and generators G2 and AG2 driven by auxiliary engine F. The associated generators in each pair are conveniently arranged on common shafts 75 and 76 respectively as shown. Generators G1 and G2 are 24 volt direct current generators and generators AG1 and AG2 are 90 volt direct current generators. Generators AG1 and AG2 are provided with voltage regulators VR1 and VR2 respectively. Storage batteries B1 and B2 are charged by generators G1 and G2 respectively.

Control panels 89 and 90 are provided one in each driving cab of the locomotive and accommodate various components such as switches and indicating lights as is clear from Figure 3 which indicates panel 99 in chain line. Motors PP1, PP2, PP3 and PP4 drive oil pumps 79, 81, 83 and 85 associated with engines C, D, A and B respectively for a purpose explained in more detail below.

Elements 80, 82, 84 and 86 associated respectively with engines C, D, A and B function to influence the electrical system shown in Figure 3 in accordance with the oil pressure in the various engines as will be described in more detail below.

Turning now to Figure 3, this shows a wiring diagram of the connections between the generators G1 and AG1 and the auxiliaries associated with engines C and D, as well as the connections which are relevant to motors M9, M10, M11 and M12 shown on the side of the change-over links 23 and 24 which is removed from generators G1 and AG1. The circuit arrangements for generators G2 and AG2 and the auxiliaries associated with engines A and B are identical with those provided for generators G1 and AG1 and the auxiliaries associated with engines C and D and have been omitted for the sake of clarity. In other words the complete circuit diagram for the electrical system of the locomotive involves, in addition to what is shown in Figure 3, a duplication of the circuits shown above the change-over links 23 and 24.

The circuit comprising the generator G1 and shown to the left of this generator, includes the 24 volt battery B1 and certain starting arrangements. The battery B1 is part of the general electrical system of the power plant and supplies current for purposes such as lighting and starting the auxiliary engine and, in some cases, for relays used in the general control system of the power plant.

The circuit comprising the generator AG1, includes motors M1 and M2 for starting the main engines C and D and motors M5 and M6 for driving the radiator cooling fan 65 and the water pumps 68 and 69.

The circuit shown below change-over links 23 and 24 comprises motors M9, M10, M11 and M12. A switch S2 permits the motors M11 and M12 to be disconnected while motors M9 and M10 remain in circuit, since the train-heating boiler 70 will not always be used.

The exhauster motor M9 drives the booster exhauster 73 which is normally only required to function during and after the operation of the brakes. It thus works intermittently, and is generally required to start under a heavy load and is accordingly provided with an independent switch EX1 operated by a coil EX1' which is energised by a switch "Cab A" or "Cab B" mounted on the drivers brake levers 101 and 109 respectively, according to which cab of a two-cab locomotive the driver is occupying. A field resistance and associated shorting-out switch EX2 controlled by a coil EX2' automatically provide for two-speed operation of the motor M9 in a known manner.

The generator G1 supplies current to the field coil FC1 of the generator AG1; this field coil is associated with the carbon pile voltage regulator VR1 and a dropping resistance AF1 which is provided with a shorting switch AG.

Battery cut-off switches BCO1 and BCO2 are provided to break the connection with the battery B1 when the voltage supplied by the generator G1 falls below the battery voltage; these switches are operated by coils BCC1 and BCC2 respectively.

The procedure on starting is as follows—

The auxiliary engine E is first started in the usual manner by means of the starter motor 77, which is energised from the battery B1. The auxiliary engine E attains a speed set by its governor and drives the generator G1 and the generator AG1, the former supplying field current to the latter.

To start the main engines C and D, the switch S1 is set to the "Start" position shown, thereby lighting the "Start" indicating light L1. To start the first main engine, the starting button SB1 is pressed thus energising the coil OP1. The coil OP1 closes a switch OP1 thus supplying current from the battery B1 to the motor PP1 which drives the pump 79 (Figures 1 and 2) arranged to draw oil from the engine sump and to deliver it via a non-return valve into the pressure feed oil circuit. When a sufficient oil pressure has been built up to flood the crankshaft bearings and other localities, a switch PS1 is closed by the action of an element 80 sensitive to oil pressure. The closing of the switch PS1 energises the coil SM1 and the governor solenoid GS1 which is part of control means 52 and arranged to actuate the engine fuel pump to give full fuel injection on starting and thus functions in the same way as solenoid 26 in Figure 1 of the drawings accompanying application No. 109,635 filed August 11, 1948, by L. F. R. Fell and R. J. W. Cousins. The coil SM1 closes the switch SM1, opens the switch SM1' and thus connects the starter motor M1 across the generator AG1 which is giving approximately 24 volts output by reason of the resistance AF1 in its field circuit. As soon as the first main engine is running, the second main engine is started in the same way, involving pressing starting button SB2, opening of switch SM2' and the closing of switch SM2, and the switch S1 is then put to "Run." The result of this is to light the "Run" indicating lamp L2 and energise the coils AF and A, thus closing the shorting switch AF of the resistance AF1 opening the switch A1 and closing the switch A2, which connects the generator AG1, now giving 90 volts output, with the motors M5, M6, M10, and provided that the switches EX1 and S2 are closed, with motors M9, M11 and M12.

Mechanical interconnections shown in broken lines may also be provided between the moving elements of the following pairs of switches SM1 and SM1', A1 and A2, SM2 and SM2', which ensure that their action is as described above, and that the generator, when giving 24 volts output is only loaded with motors M1 and M2, and that these motors cannot receive the 90 volts output of the generator AG1.

Fuses are provided as shown for each motor and do not require any description as they are of known type.

The use of a 90 volt supply for the motors M5, M6, M9, M10, M11 and M12 as described above represents a compromise between the weight of these motors (which must not be too large) on the one hand and insulation requirements and fire risks on the other hand, which is convenient for a general purpose railway locomotive.

In the case of a power plant with four main and two auxiliary engines as illustrated in Figures 1 and 2 it is generally preferred that each auxiliary engine should provide the drive for the cooling means of the associated pair of main engines whereas the change-over links 23 and 24 allow motors M9, M10, M11 and M12 to be driven by the generator associated with either auxiliary engine.

In the case of a four engine power plant referred to above, the output of each of the 90 volt generators may be such that either of them could drive all the required motors alone; such an arrangement would prevent the failure of current provided by one auxiliary engine from interfering with the operation of the locomotive. However, since failure of an auxiliary engine, and the resulting stoppage of the two associated main engines, is more likely than current failure, it is generally satisfactory to provide the generators of sufficient power to supply motors as shown on the drawing.

The electrical system described above is based on the assumption that the power plant will give substantially constant power output and hence require substantially constant-speed drive for the cooling means. It will be appreciated, however, that it is easy to modify the system described to provide any desired relationship between the speed at which the cooling means are operated and the operating condition of the power plant, for example, the cooling means may be controlled according to the temperature of the cooling system of the power plant, by means of one or more temperature sensitive elements, acting through suitable relays if necessary to vary the supply of current to, and hence the speed of, the electrical motors driving the cooling means. In this way, substantially thermostatic control of the cooling system may be obtained.

Figure 4:
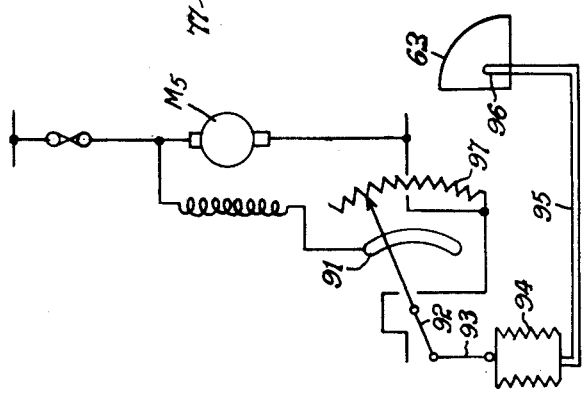
Figure 4 shows a modification of Figure 3.

One way of providing such thermostatic control is shown diagrammatically in Figure 4, where the circuit of the motor M5, which drives cooling fan 65, is shown with the necessary modifications. In this drawing the motor M5 is a shunt-wound motor and the current in its field coil is varied by the variable resistance comprising resistor 97, and arcuate strip 91 both contacted by movable pivoted arm 92. The arm 92 is connected by link 93 to a bellows 94 to which is connected a pipe 95 having its closed end 96 located within the radiator 63. The pipe 95 and bellows 94 are filled with some suitable fluid, for example a volatile organic liquid which will exert a pressure within the bellows 94 corresponding to the temperature of the radiator water or vapour surrounding the pipe end 96.

As shown, the pivoted arm 92, link 93 and bellows 94 are in the position corresponding to low temperature within the radiator 63, where current to the field coil of motor M5 has to pass through the major portion of the resistor 97 thus causing motor M5 to run at low speed. As the temperature in radiator 63 increases, the pressure generated within bellows 94 causes the pivoted arm 92 to swing in a clockwise direction thus reducing the portion of the resistor 97 in series with the field coil of motor M5 and hence increasing the speed of the motor M5. It will be appreciated that identical arrangements may be made in respect of motors M6, M7 and M8 and that, if required, known relays may be used to augment the power exerted by the bellows 94.

I claim:

1. A compression ignition power plant comprising a main compression ignition engine, a blower for said main engine, an independent auxiliary engine to drive said blower, means for controlling said main engine and said auxiliary engine to cause said main engine to give substantially constant power output over its running speed range, cooling means for said main engine, means for producing motion of cooling fluid in relation to said cooling means, a first generator driven by said auxiliary engine, a second generator driven by said auxiliary engine and arranged to give a higher output voltage than said first generator, an automatic voltage regulator to maintain substantially constant the output voltage of said second generator, connecting means whereby said first generator supplies a battery of the general electrical system of the power plant and energises the field of said second generator, a direct current motor supplied by said second generator and means for causing said motor to drive said means for producing motion of cooling fluid.

2. A compression ignition power plant comprising a main compression ignition engine, a blower for said main engine, an independent auxiliary engine to drive said blower, a means for controlling said main engine and said auxiliary engine to cause said main engine to give substantially constant power output over its running speed range, cooling means for said main engine, means for producing motion of cooling fluid in relation to said cooling means, a first generator driven by said auxiliary engine, a second generator driven by said auxiliary engine, an automatic voltage regulator to maintain substantially constant the output voltage of said second generator, control means to cause said second generator to give a lower output voltage substantially equal to the output voltage of said first generator and a higher voltage output higher than that of said first generator, connecting means whereby said first generator supplies a battery of the general electrical system of the power plant and energises the field of said second generator, a starter motor for said main engine, means for supplying said starter motor with the lower output voltage from said second generator, a direct current motor, means for supplying said direct current motor with the higher voltage output from said second generator and means for causing said direct current motor to drive said means for producing motion of cooling fluid.

3. A compression ignition power plant comprising a main compression ignition engine, a blower for said main engine, an independent auxiliary engine to drive said blower, means for controlling said main engine and said auxiliary engine to cause said main engine to give substantially constant power output over its running speed range, cooling means for said main engine, means for producing motion of cooling fluid in relation to said cooling means, a first generator driven by said auxiliary engine, a second generator driven by said auxiliary engine, an automatic voltage regulator to maintain substantially constant the output voltage of said second generator, control means to cause said second generator to give a lower output voltage substantially equal to the output voltage of said first generator and a higher voltage output higher than that of said first generator, connecting means whereby said first generator supplies a battery of the general electrical system of the power plant and energises the field of said second generator, a starter motor for said main engine, means for supplying said starter motor with the lower output voltage from said second generator, a direct current motor, means for supplying said direct current motor with the higher voltage output from said second generator, means for causing said direct current motor to drive said means for producing motion of cooling fluid and means to prevent the higher voltage output of said second generator from being applied to said starter motor and to prevent said second generator from being loaded with said direct current motor when giving its lower voltage output.

4. A compression ignition power plant comprising a main compression ignition engine, a blower for said main engine, an independent auxiliary engine to drive said blower, means for controlling said main engine and said auxiliary engine to cause said main engine to give substantially constant power output over its running speed range, cooling means for said main engine, means for producing motion of cooling fluid in relation to said cooling means, a first generator driven by said auxiliary engine, a second generator driven by said auxiliary engine and arranged to give a higher output voltage than said first generator, an automatic voltage regulator to maintain substantially constant the output of said second generator, connecting means whereby said first generator supplies a battery of the general electrical system of the power plant and energises the field of said second generator, a first direct current motor supplied by said second generator, means for causing said motor to drive said means for producing motion of cooling fluid, a second direct current motor for driving auxiliary apparatus not associated with said cooling means and means for supplying said second motor with the voltage output from said second generator.

5. A compression ignition power plant as claimed in claim 4 in which all elements, with the exception of said second direct current motor are duplicated and means are provided to connect said second direct current motor with either of the two second generators.

JOHN AMBROSE BENNETT-POWELL.

REFERENCES CITED

The following references are of record in the file of this patent:

UNITED STATES PATENTS

| Number | Name | Date |
|---|---|---|
| 979,003 | Heany | Dec. 20, 1910 |
| 1,167,509 | MacDonald | Jan. 11, 1916 |
| 1,200,997 | Spear | Oct. 10, 1916 |
| 1,353,678 | Torrent, Jr. | Sept. 21, 1920 |
| 1,356,065 | Heinze | Oct. 19, 1920 |
| 1,493,773 | Dorion | May 13, 1924 |
| 1,662,723 | Snow | Mar. 13, 1928 |
| 1,992,568 | Connor | Feb. 26, 1935 |
| 2,070,615 | Plante | Feb. 16, 1937 |
| 2,403,393 | Reggio | July 2, 1946 |